Jan. 13, 1948.    R. W. STARR    2,434,443
FULL AUTOMATIC LANDING LEGS FOR SEMI-TRAILERS
Filed July 17, 1944    4 Sheets-Sheet 1

INVENTOR.
RALPH W. STARR
BY
*Munn, Liddy & Glascum*
ATTORNEYS

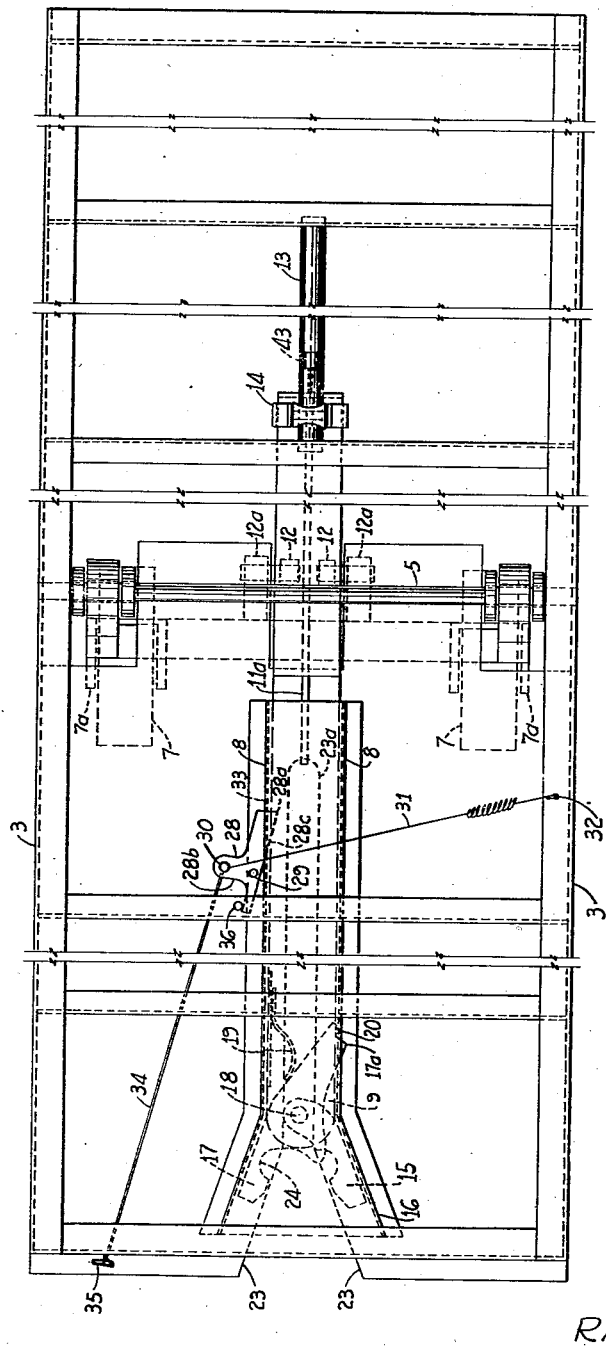

Jan. 13, 1948.                R. W. STARR                 2,434,443
            FULL AUTOMATIC LANDING LEGS FOR SEMI-TRAILERS
                  Filed July 17, 1944           4 Sheets-Sheet 3
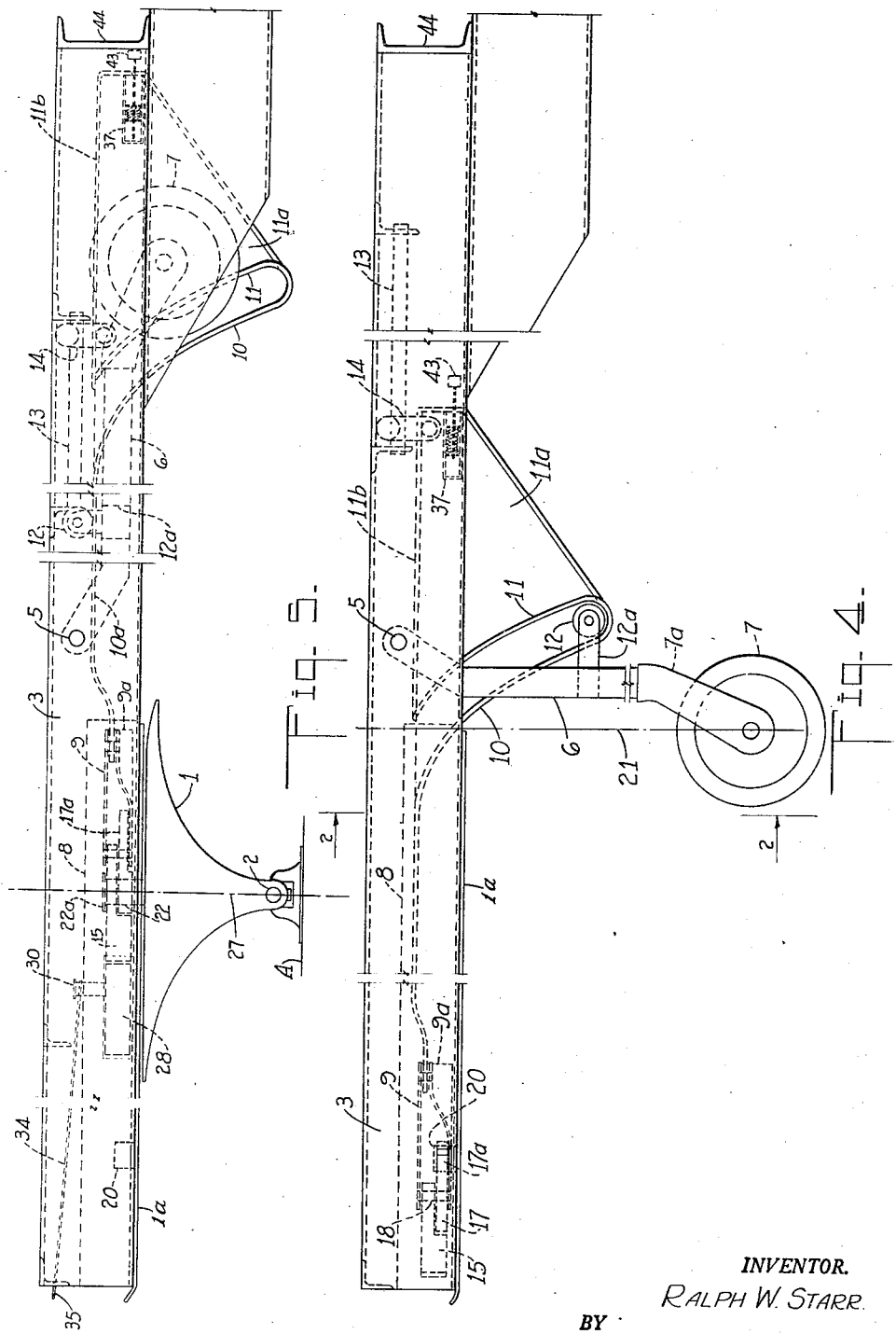
INVENTOR.
RALPH W. STARR.
BY
ATTORNEYS

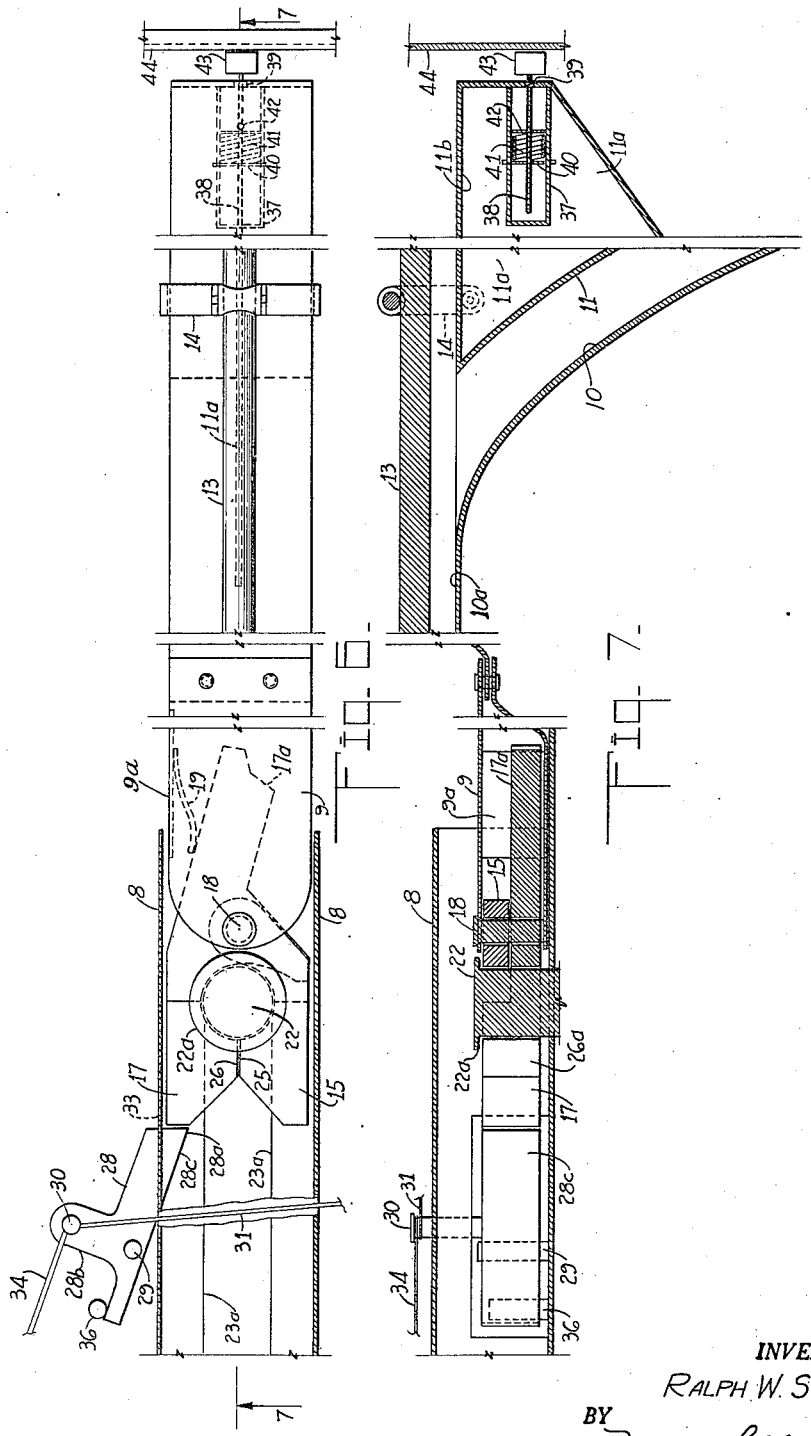

Patented Jan. 13, 1948

2,434,443

UNITED STATES PATENT OFFICE 2,434,443

FULL AUTOMATIC LANDING LEGS FOR SEMITRAILERS

Ralph W. Starr, Napa, Calif.

Application July 17, 1944, Serial No. 545,326

8 Claims. (Cl. 280—33.05)

The present invention relates to improvements in full automatic landing legs for semi-trailers and it consists of the combinations, constructions and arrangements hereinafter described and claimed.

An object of my invention is to provide full automatic landing legs for semi-trailers in which the front of the trailer will be supported at approximately the same position by the landing legs when they are in operative position as when the trailer is supported by the lower fifth wheel of the truck. This permits the trailer load to be properly distributed when the trailer is disconnected from the truck and the same distribution of weight will be manifest when the trailer is connected to and supported by the truck.

A further object of my invention is to provide a device of the type described which has novel means for automatically locking the landing legs when they are swung into operative or extended position. These legs cannot be freed for movement into retracted or inoperative position, until the truck is moved under the trailer in a position to support the forward end of the trailer.

The legs are also automatically locked in retracted position and the operator must operate a release mechanism before the truck can be disconnected from the trailer. The trailer landing legs are swung into supporting position before the truck becomes disconnected from the trailer. The device is relatively simple in construction and operates automatically.

Other objects and advantages will appear in the following specification, and the novel features of the device will be particularly pointed out in the appended claims.

My invention is illustrated in the accompanying drawings forming a part of this application, in which:

Figure 3 is a plan view of the trailer showing the wheels extended;

Figure 4 is a side elevation of Figure 3;

Figure 5 is a view similar to Figure 4, but shows the wheels retracted;

Figure 6 is an enlarged plan view of the operating mechanism showing the mechanism for locking the legs in retracted position; and Figure 7 is a longitudinal section taken along the line 7—7 of Figure 6.

While I have shown only the preferred forms of my invention, it should be understood that various changes or modifications may be made within the scope of the appended claims without departing from the spirit and scope of the invention.

Figure 1:
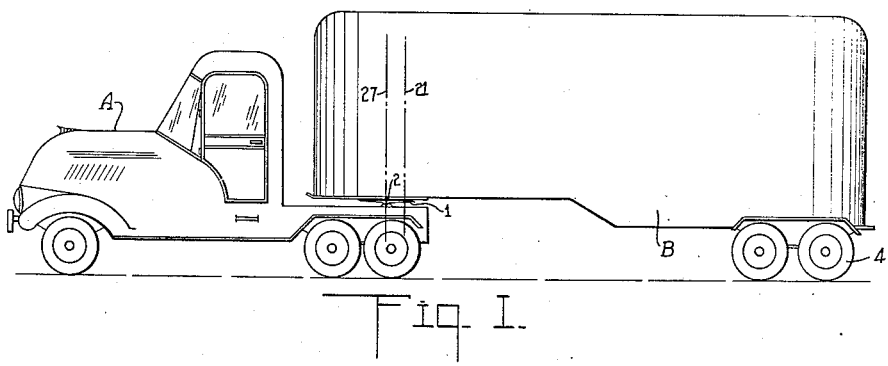
Figure 1 is a side elevation of the trailer shown operatively applied to the truck.

In carrying out my invention, I provide a truck indicated generally at A, see Figure 1, and this truck has a lower fifth wheel 1 pivotally secured to the truck at 2. A trailer indicated generally at B is removably connected to the fifth wheel 1 by my novel mechanism which will now be described.

Figure 2:
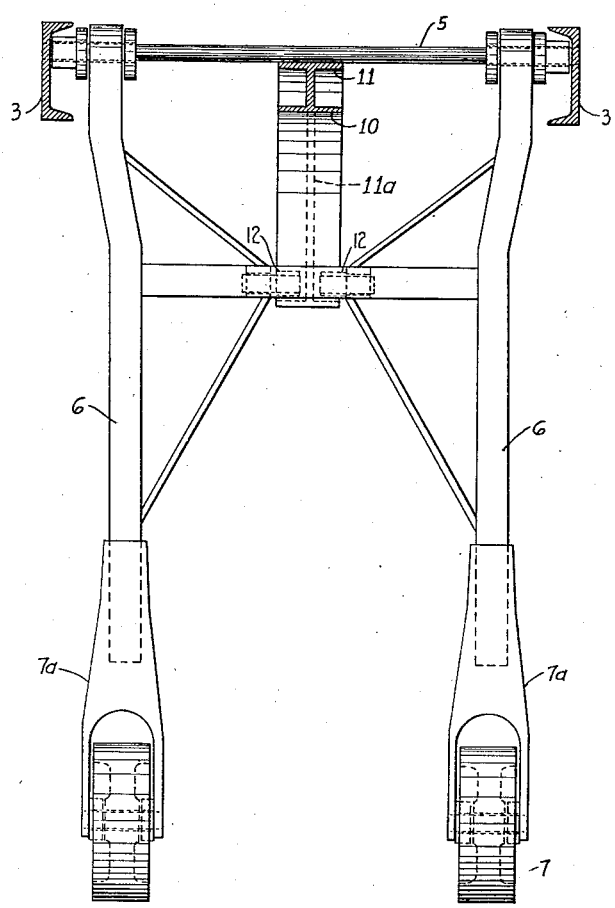
Figure 2 is an enlarged transverse section taken along the line 2—2 of Figure 4.

In Figure 3 I show a plan view of the trailer frame 3 and this frame may be of any length desired and is supported at its rear by wheels 4, see Figure 1. It is best to refer to Figures 3 and 4 to show the operating mechanism. The frame 3 has a landing leg pivot shaft 5 extending transversely thereacross and a pair of landing support legs 6 are pivotally mounted on the shaft and are swingable from a vertical position shown in Figure 4 into a substantially horizontal position shown in Figure 5. Figure 2 illustrates the landing legs as carrying landing wheels 7 for supporting the front of the trailer when the truck is disconnected. The wheels 7 are supported by adjustable landing wheel yokes 7a which in turn are connected to the legs 6.

A centrally disposed and longitudinally extending jaw guide 8 is carried by the frame 3 and a jaw carrying member 9 is designed to move along the guide and to carry a cam-shaped travelling track 10 therewith. Figure 4 shows an arcuate guide 11 associated with the curved portion of the cam track. Rollers 12 are secured to the legs 6 by landing leg roller arms 12a and move between the cam track 10 and guide 11. A rearward movement of the track 10 will cause the rollers 12 to swing the legs 6 from the vertical position shown into the horizontal position indicated in Figure 5. The track and guide are mounted on a supporting web 11a and the web has a travelling rail 11b disposed at its top and connected to a horizontally disposed rod 13 by a two-wheeled travelling trolley 14. The trolley 14 rolls along the two sides of the rail 11b and it also rolls along the rod 13 thus permitting the full movement of the cam-shaped track 10 to be carried by the trolley. The trolley moves along the rod 13 for a portion of the rail movement and along the rail 11b for the remainder of the movement.

When the landing legs are in vertical position, the front end of the member 9 will have a pivoted king pin receiving jaw 15 positioned in an outwardly flared portion 16 of the guide 8, see Figure 3. The member 9 also has a second king pin receiving jaw 17 pivoted to the slide at 18 which is the same pivot that connects the jaw 15 to the slide. The jaw 17 has an extension 17a that is designed to be actuated by a leaf-spring 19 and be swung into a notch or dog slot 20 of the guide 8 for holding the member 9 from moving rearwardly. In this way the extension 17a locks the cam track against rearward movement and the track in turn holds the legs in a vertical position. Figure 4 indicates a vertical plane 21 extending through the aligned axes of the wheels 7 and shows where the trailer B will be supported at its forward end when disconnected from the truck.

The lower fifth wheel 1 has a king pin 22 with a head 22a formed thereon. The upper half 1a of the fifth wheel is carried by the frame 3 and has a V-cut 23 that is designed to receive the king pin as the truck connects to the trailer. The flared portion 16 of the guide 8 permits the jaws to open to receive the king pin 22. A recess 24 in the jaw 17 receives the king pin and the pin in moving rearwardly will bear against the wall of the recess for moving the jaw rearwardly. The initial movement of the jaw 17 rearwardly will cause it to pivot about the jaw pin 18 and to free the extension 17a from the dog slot 20 and thus free the member 9 and permit it to move rearwardly. The jaw 15 will close about the king pin. Further movement of the king pin will cause it to enter a slot 23a and the pin will carry with it the jaws 15 and 17. The opposed faces 25 and 26 of the jaws will abut each other. The jaws will be held in closed position by the side walls of the guide 8 and therefore the king pin 22 will be pivotally connected to the trailer.

Movement of the king pin 22 rearwardly in the slot 23a will move both the member 9 and the cam track 10 rearwardly. The initial rearward movement of the cam track will cause the rollers 12 to lift the wheels 7. The rail 11b will slide with respect to the trolley 14 and when the left-hand end of the rail reaches the trolley, further rearward movement of the cam track will carry the trolley along the rod. The cam track will continue in its rearward movement until the rollers 12 ride on the horizontal portion 10a of the track. At this point the rollers will support the legs 6 in a horizontal position and the wheels 7 will be moved into an out-of-the-way position between the frame members. It will be noted in Figure 1, that the center line 27 of the king pin 22, when the landing wheels are retracted, will be only a short distance removed from the plane 21 which represents the place of support for the trailer when disconnected from the truck and supported by the wheels 7. The center line 27 represents the support for the trailer when the lower fifth wheel 1 constitutes the support rather than the wheels 7. Since the two lines are close to each other, it will be seen that there is a negligible shifting of the center gravity of the trailer load when the trailer is supported by the wheels 7 or when it is supported by the lower fifth wheel. This is one of the principal objects of the invention.

Referring to Figure 3 it will be noted that I show a locking dog 28 for holding the wheels 7 in raised or retracted position. The dog is pivoted to the frame at 29 and has a projection 30 to which an over-center spring 31 is connected. The projection 30 is so arranged with respect to the pivot 29 and to the connection 32 of the spring with the frame as to cause the spring to be moved past the pivot joint 29 when the dog is in one extreme position and to be moved to the other side of the pivot point when the dog is in its other extreme position. Normally the dog has a portion 28a extending through a slot 33 in the guide wall 8 so that this portion will lie in the path of the moving member 9, see Figure 6.

When the member 9 reaches its rearmost position, the jaws 15 and 17 will be closed and disposed in a position in back of the dog. The portion 28a of the dog will act as a lock for the jaw 17 and prevent forward movement of the member 9 with respect to the frame. The parts remain locked in this position so long as the truck is connected to the trailer. The jaws 15 and 17 permit the lower fifth wheel 1 to rotate the king pin 22 in the jaw recesses 24 and thus the truck can be steered and turned relatively to the trailer when the truck is making turns.

A release rod 34, see Figure 3, extends forwardly from the projection 30 to a point at the front of the frame 3 and when the operator wishes to disconnect the truck from the trailer he pulls on a knob 35 which will cause the rod to swing the dog 28 and free the projection 28a from the jaw. The swinging of the dog to free the jaw 17 causes the projection 30 to move beyond dead center and the spring will now hold the portion 28b against the stop 36, see Figure 7.

A forward movement of the truck with respect to the trailer will cause the member 9 to move forwardly in the guide 8 and as soon as the jaws and member strike the dog 28, they will swing the dog so that its edge 28c will ride against the side 9a of the member 9. The spring 31 will now have a tendency to swing the dog 28 into the position shown in Figure 3. The member will continue in its movement until the jaws reach the flared portion 16 at which point the jaws will be swung outwardly by the pull of the king pin 22 in being freed from the trailer. The outward swinging movement of the jaws will cause the jaw portion 17a to lock the member 9 from retraction until the truck is again connected to the trailer. The legs are therefore locked in operative or down position.

It will be seen that I provide novel means for automatically locking the legs in operative position and also in inoperative position. In addition to this I make it necessary for the operator to actuate the release rod 34 before the truck can be disconnected from the trailer.

In Figure 7 I show a shock absorber that is placed in the traveling web 11a. The shock absorber comprises a frame 37 that is secured to the web. A spring pressed bolt 38 is carried by the frame and slides in an opening 39. The inner end of the bolt 38 slides in a transverse member 40 and one end of a spring 41 bears against the same member. The other end of the spring contacts a pin 42 carried by the bolt. The outer end of the bolt supports a bumper 43.

During the rearward movement of the web 11a the bolt 38 is carried therewith. As the web nears the end of its travel, the bumper 43 strikes a cross member 44 and the pin 42 places the spring under compression. The bumper acts as a shock absorber. During the initial forward movement of the web when the truck is being freed from the trailer, the spring 41 will aid in this movement.

I claim:

1. In combination, a trailer, a pair of legs pivotally secured thereto, means for swinging the legs from operative position where they support the trailer into retracted position and vice versa, said means including a cam adapted to move in the direction of the length of the trailer, a supporting rail carried by the cam, a second supporting rail carried by the trailer, and a trolley slidable along both rails and supporting the cam, the trolley riding along the cam rail during a portion of the cam movement, whereby the length of the second rail can be less than the length of movement of the cam when swinging the legs.

2. In combination, a trailer having a front and rear end and a longitudinal extending guide, a pair of landing legs pivotally secured to the trailer, a member slidable along the guide and operatively connected to the legs for swinging them into trailer supporting position when the member is moved toward the trailer front and into retracted position when moved toward the trailer rear, a pair of king pin engaging jaws pivotally secured to the front end of the member, the front end of the guide being flared to permit the jaws to open, the remainder of the guide holding the jaws in closed position, a spring actuated locking dog for automatically holding the jaws from forward movement when the jaws and member have been moved to retract the landing legs, manually controlled means for swinging the dog to free the jaws whereby the jaws and member can move forwardly, a stop for limiting the swinging movement of the dog into jaw freeing position, said dog having a dog-tripping portion swingable into the path of the jaws when the dog is in jaw freeing position, the forward movement of the jaws swinging the dog back into a position where it will again lock the jaws against forward movement when the jaws and member are again moved rearwardly for retracting the legs.

3. In combination; a trailer; a supporting leg pivotally secured thereto; means for swinging the leg from operative position where it supports the trailer into retracted position and vice versa; said means including a cam adapted to move in the direction of the length of the trailer, a supporting rail carried by the cam, a trolley rod mounted longitudinally of the trailer and extending rearwardly beyond the cam rail when the leg is disposed in operative trailer-supporting position, the cam rail being movable into a position to extend rearwardly beyond the trolley rod when the leg is moved into retracted position, and a trolley riding on the trolley rod and the cam rail for supporting the cam as the latter is moved longitudinally of the trailer.

4. In combination; a trailer; a supporting leg pivotally secured thereto; means for swinging the leg from operative position where it supports the trailer into retracted position and vice versa; said means including a cam adapted to move in the direction of the length of the trailer, a supporting rail carried by the cam, a trolley rod mounted longitudinally of the trailer and extending rearwardly beyond the cam rail when the leg is disposed in operative trailer-supporting position, the cam rail being movable into a position to extend rearwardly beyond the trolley rod when the leg is moved into retracted position, and a trolley riding on the trolley rod and the cam rail for supporting the cam as the latter is moved longitudinally of the trailer; and a shock absorber mounted on the cam and having a plunger arranged to strike a fixed abutment on the trailer when the cam reaches its rearmost position.

5. In combination, a trailer, a pair of landing legs pivotally secured thereto, a single cam mounted on the trailer along the longitudinal center line thereof for longitudinal movement relative to the trailer and having a cam track, rollers extending from the landing legs and riding in the cam track, the latter being designed to swing the legs into operative position to support the trailer when the cam is moved in one direction and to retract the legs when the cam is moved in the opposite direction, and means operable by a truck when the latter is backed relative to the trailer for moving the cam in a direction to retract the legs, said means being positively operated by the truck when the truck is moved forwardly relative to the trailer for moving the cam in a direction to extend the legs.

6. In combination, a trailer, a pair of landing legs pivotally secured thereto, a single cam mounted on the trailer along the longitudinal center line thereof for longitudinal movement relative to the trailer and having a cam track, rollers extending from the landing legs and riding in the cam track, the latter being designed to swing the legs into operative position to support the trailer when the cam is moved in one direction and to retract the legs when the cam is moved in the opposite direction, and means operable by a truck when the latter is backed relative to the trailer for moving the cam in a direction to retract the legs, said means being positively operated by the truck when the truck is moved forwardly relative to the trailer for moving the cam in a direction to extend the legs, the cam track including a horizontal portion movable into a position underneath the rollers to support the legs when the latter are retracted.

7. In a full automatic landing leg for a semi-trailer, a leg-actuating member having a horizontal roller track formed on the forward portion thereof, a roller guide leading rearwardly and downwardly from said horizontal roller track and forming an uninterrupted continuation thereof, and a trolley rail surmounting the member and extending along the upper rear portion thereof, the trolley rail having exposed side edges along which a trolley may roll.

8. In combination; a trailer having a substantially rectangular-shaped chassis frame; a pair of landing legs pivotally secured to the chassis frame; a cam mounted on the trailer along the longitudinal center line thereof for longitudinal movement relative to the trailer and having a cam track; a trolley rod mounted lengthwise of the trailer and having a trolley thereon supporting the rear portion of the cam, the trolley having swinging movement about the trolley rod in a lateral direction whereby the rear part of the cam can move laterally when required; rollers extending from the landing legs and riding in the cam track, the latter being designed to swing the legs into operative position to support the trailer when the cam is moved in one direction and to retract the legs when the cam is moved in the opposite direction; and means for operating the cam to extend or retract the legs; the lateral swinging movement provided the rear part of the cam preventing binding of the rollers in the cam track when the chassis frame is twisted by elevating one corner thereof higher than the remaining corners of the frame.

RALPH W. STARR.

REFERENCES CITED

The following references are of record in the file of this patent:

UNITED STATES PATENTS

| Number | Name | Date |
|---|---|---|
| 1,383,381 | Borst | July 5, 1921 |
| 1,898,854 | Reid | Feb. 21, 1933 |
| 2,080,342 | Seyferth | May 11, 1937 |
| 2,120,509 | Reid | June 14, 1938 |
| 2,135,205 | Wilson | Nov. 1, 1938 |
| 2,232,897 | Winn | Feb. 25, 1941 |